(12) United States Patent
Smith et al.

(10) Patent No.: US 11,404,696 B1
(45) Date of Patent: Aug. 2, 2022

(54) SECONDARY AQUEOUS BATTERY ELECTRODES INCLUDING VINYL ACETATE-ETHYLENE

(71) Applicant: ZAF ENERGY SYSTEMS, INCORPORATED, Bozeman, MT (US)

(72) Inventors: Hannah S. Smith, Bozeman, MT (US); Melissa D. McIntyre, Butte, MT (US); Adam Weisenstein, Bozeman, MT (US); Andrew F. Souder, II, Joplin, MO (US)

(73) Assignee: ZAF ENERGY SYSTEMS, INCORPORATED, Bozeman, MT (US)

( * ) Notice: Subject to any disclaimer, the term of this patent is extended or adjusted under 35 U.S.C. 154(b) by 0 days.

(21) Appl. No.: 17/569,338

(22) Filed: Jan. 5, 2022

(51) Int. Cl.
*H01M 4/62* (2006.01)
*H01M 10/054* (2010.01)
*H01M 10/24* (2006.01)
*H01M 4/24* (2006.01)
*H01M 4/32* (2006.01)
*H01M 4/50* (2010.01)
*H01M 4/02* (2006.01)
*H01M 4/66* (2006.01)

(52) U.S. Cl.
CPC ........... *H01M 4/622* (2013.01); *H01M 4/242* (2013.01); *H01M 4/244* (2013.01); *H01M 4/246* (2013.01); *H01M 4/248* (2013.01); *H01M 4/32* (2013.01); *H01M 4/50* (2013.01); *H01M 10/054* (2013.01); *H01M 10/24* (2013.01); *H01M 4/24* (2013.01); *H01M 4/624* (2013.01); *H01M 4/628* (2013.01); *H01M 4/66* (2013.01); *H01M 4/661* (2013.01); *H01M 4/669* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | |
|---|---|---|
| 5,863,676 A | 1/1999 | Charkey et al. |
| 8,652,684 B2 | 2/2014 | Bernard et al. |
| 9,972,875 B2 | 5/2018 | Kakeya et al. |
| 10,044,016 B2 | 8/2018 | Kakeya et al. |
| 10,770,717 B2 | 9/2020 | Sato et al. |
| 2006/0067876 A1 | 3/2006 | Zhu |
| 2012/0153220 A1 | 6/2012 | Watanabe et al. |
| 2016/0164106 A1 | 6/2016 | Sopchak |
| 2018/0086646 A1 | 3/2018 | LaCoste et al. |
| 2020/0365953 A1 | 11/2020 | Pham et al. |

FOREIGN PATENT DOCUMENTS

| | | |
|---|---|---|
| CN | 102576827 B | 9/2016 |
| WO | 2010-053257 A2 | 5/2010 |
| WO | 2010-058901 A2 | 5/2010 |

*Primary Examiner* — Laura Weiner
(74) *Attorney, Agent, or Firm* — Brooks Kushman P.C.

(57) ABSTRACT

A green secondary electrode includes a conductive substrate, active material and material additives in direct contact with the conductive substrate, and a combination of vinyl acetate-ethylene and methylcellulose-based additive binding the conductive substrate, active materials, and material additives together. The green secondary electrode may be a positive electrode or a negative electrode.

15 Claims, 6 Drawing Sheets

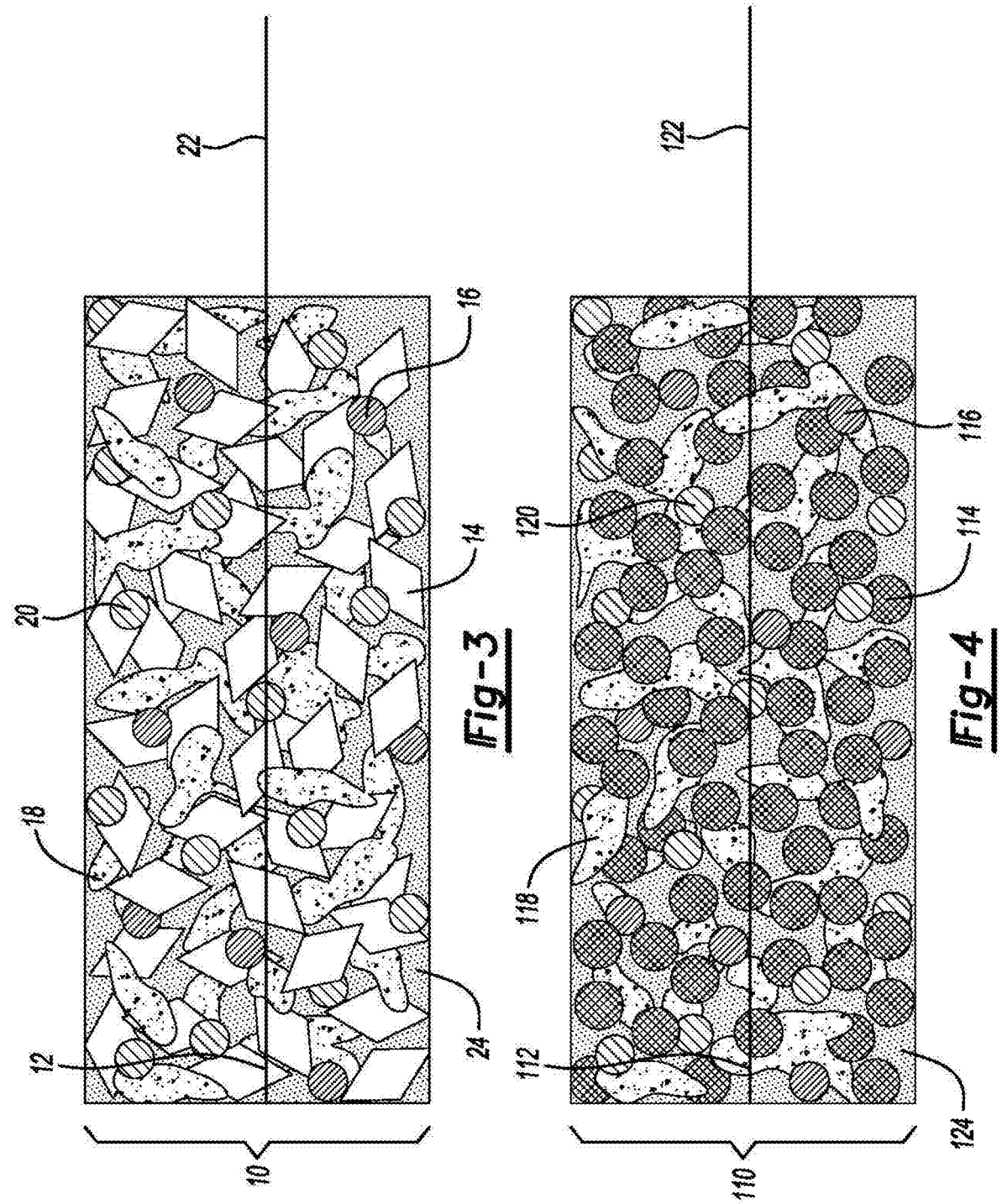

SECONDARY AQUEOUS BATTERY ELECTRODES INCLUDING VINYL ACETATE-ETHYLENE

TECHNICAL FIELD

This disclosure relates to secondary electrodes and batteries containing the same.

BACKGROUND

A secondary cell may include an anode and cathode.

Chemical reactions of a secondary cell are reversible. When the cell is being charged for example, the anode may become positive and the cathode may become negative. When the cell is being discharged, it behaves like a primary cell.

SUMMARY

An electrochemical component has a green secondary electrode including a conductive substrate and electrochemically active materials and material additives in direct contact with the conductive substrate, and a combination of Vinyl Acetate-Ethylene (VAE) and methylcellulose-based additives, such as CarboxyMethylCellulose (CMC) or HydroxyPropyl MethylCellulose (HPMC), binding the conductive substrate, electrochemically active materials, and material additives together. Specifically, electrodes for aqueous-based batteries, such as the lithium-zinc, nickel-zinc (Ni—Zn), silver-zinc, zinc-air, and zinc-ion batteries, made with these binder combinations are mechanically robust and exhibit high electrochemical performance.

BRIEF DESCRIPTION OF THE DRAWINGS

FIG. 3 is a schematic view of a negative electrode formed from a zinc-based active material, material additives, and a conductive substrate bound together by VAE and HPMC.

FIG. 4 is a schematic view of a positive electrode formed from nickel-based active material, material additives, and a conductive substrate bound together by VAE and HPMC.

DETAILED DESCRIPTION

Various embodiments are described herein. The disclosed embodiments, however, are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art. Moreover, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure may be desired for particular applications or implementations.

A challenge of aqueous battery systems is the selection of a suitable binder system that is chemically compatible with the electrolyte and can properly bind the active material. One solution to this issue has been to incorporate traditional binders, such as PTFE and HEC. However, PTFE is expensive and may be underwhelming in its binding abilities without being sintered or fibrillated. Furthermore, commonly used PTFE suspensions include surfactant to help disperse it in solution. The surfactant and/or processing steps typically used with PTFE binders can cause problems in the battery that can lead to early issues due to decomposition of active materials in the electrode at the elevated temperatures required for sintering, mechanical stresses/strains during fibrillation pulverizing of active material, foaming of the surfactant restricting electrolyte access within the electrode, or decomposition of the surfactant impacting the electrode/electrolyte. Additionally, when a powder form of PTFE is used as the binding system, it must be fibrillated using an organic solvent. The use of an organic solvent in large scale production is costly, and may create other issues.

Alternative water-based binders common to other battery chemistries, such as SBR and EVA used in lithium-ion chemistries, have been used with some success. However, these binders lack individual binding quality, even when combined with a methylcellulose-based binder, and must be combined with another robust binder, such as sintered PTFE.

Figure 1:
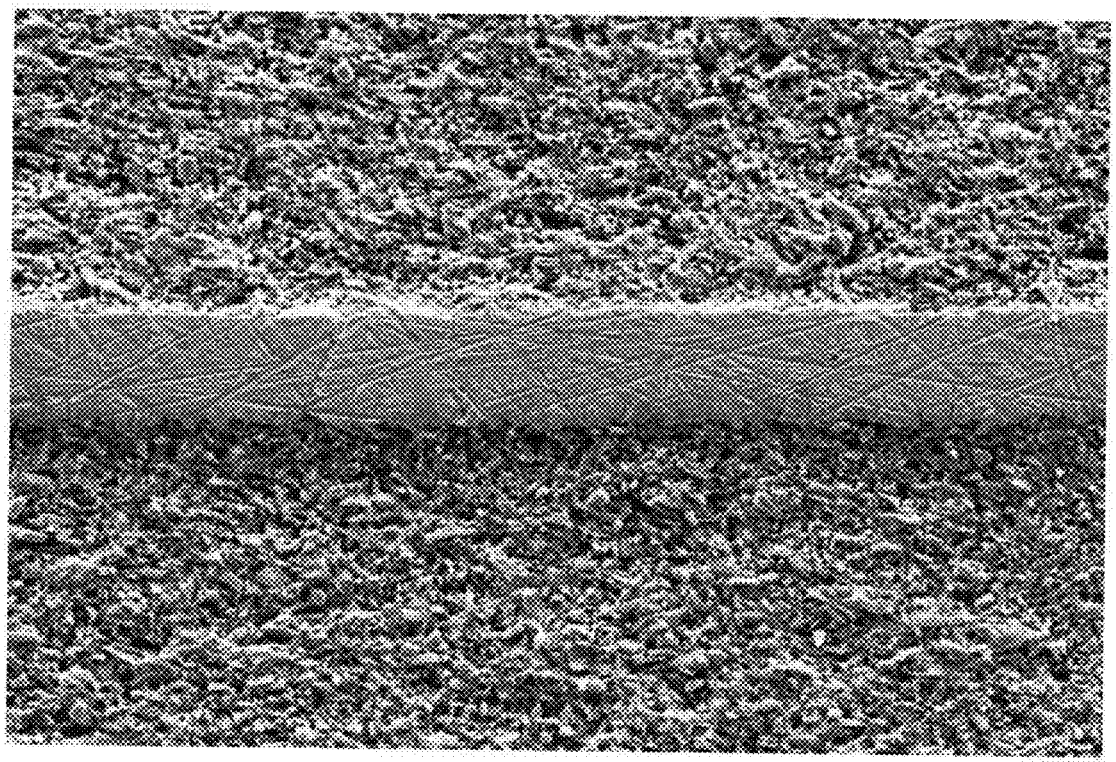
FIG. 1 is a field emission scanning electron microscope image of a negative electrode formed from a zinc-based active material, material additives, and a conductive substrate bound together by VAE and HPMC.
Figure 2:
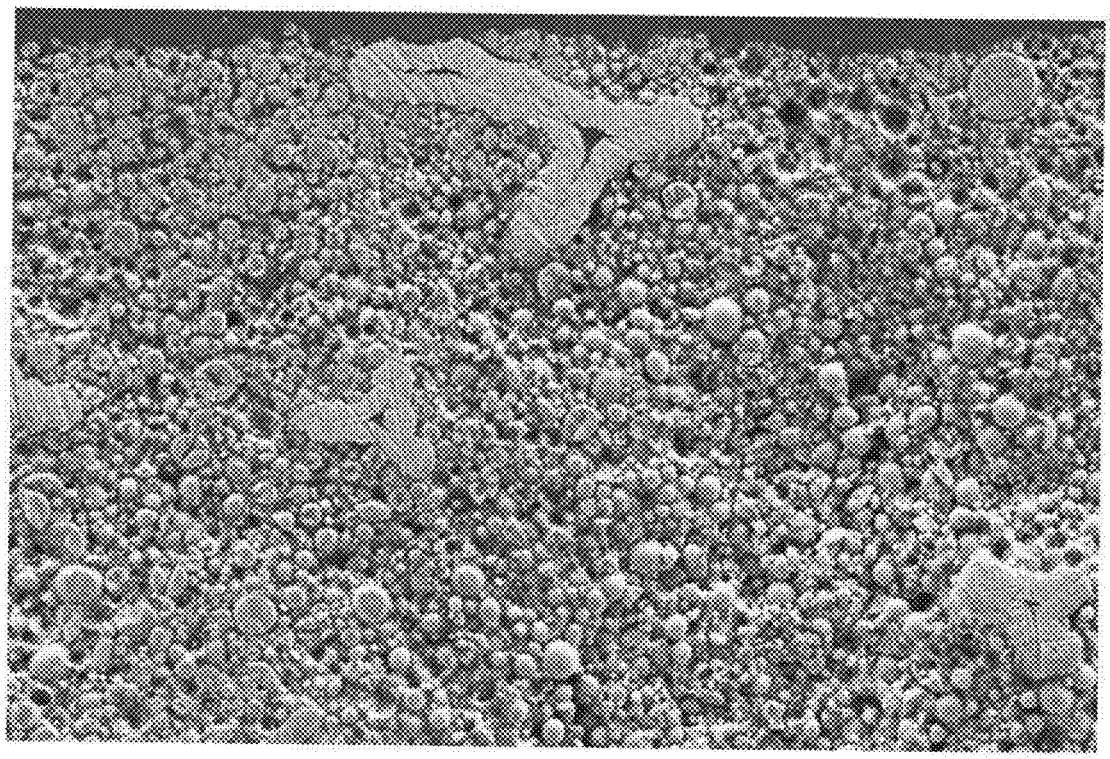
FIG. 2 is a field emission scanning electron microscope image of a positive electrode formed from nickel hydroxide active material, material additives, and a conductive substrate bound together by VAE and HPMC.

To overcome the issues with using PTFE, SBR, and EVA binders, a combination of VAE and methylcellulose-based binders was substituted into electrodes for alkaline Ni—Zn battery systems that produced unexpected superior robustness and electrochemical results compared to PTFE, SBR, and EVA. Those skilled in the art will know that copolymers consisting of vinyl acetate and ethylene can be split into two distinct and separate categories: VAE in which the copolymer is over 40% vinyl acetate, and EVA in which the copolymer is up to 40% vinyl acetate. Typical VAE binders, however, contain 60% or greater amounts of vinyl acetate. The percentage of vinyl acetate in the copolymer has a significant impact on the material properties of the copolymer, and thus can influence the material properties of binder combinations made with VAE or EVA. VAE and methylcellulose-based binder combinations offer a less expensive and surfactant free binder system that is water-based, resulting in a stable slurry and a robust and homogeneous electrode. Furthermore, electrodes manufactured with VAE and methylcellulose-based binder combinations were robust enough to eliminate the need for an additional binder, unlike SBR and EVA. FIG. 1, for example, shows a homogeneous zinc-based negative electrode utilizing VAE and HMPC as the binder system and FIG. 2 shows a homogeneous nickel hydroxide positive electrode utilizing VAE and HPMC as the binder system.

Referring to FIG. 3, a green secondary negative electrode 10 includes a conductive substrate 12 (e.g., aluminum, brass, bronze, carbon, conductive polymers, copper, stainless steel, steel, tin, titanium, zinc, or combinations thereof), which may be for example a foil with or without perforations, expanded metal, or foam, negative active materials 14 (e.g., aluminum or cadmium-based, hydrogen absorbing alloys, intercalation material, iron-based, zinc-based), other material additives 16 (e.g., conductive additives, electrolyte retention additives, gas suppressing additives, gelling agents, nucleation additives, plasticizers, stabilization additives, and/or combinations thereof), a binder combination of VAE 18 and a methylcellulose-based additive 20, and a tab 22. The conductive substrate 12 is in direct contact with the tab 22. The negative active materials 14 is in direct contact with the conductive substrate 12. The combination of VAE 18 and methylcellulose-based additive 20 bind the conductive substrate 12, negative active materials 14, and other material additives 16 together. Electrolyte can fill void spaces 24 of the negative electrode 10.

Referring to FIG. 4, a green secondary positive electrode 110 includes a conductive substrate 112 (e.g., aluminum, carbon, conductive polymers, nickel, stainless steel, steel, titanium, or combinations thereof), which may be for example a foil with or without perforations, expanded metal, cloth, or foam, positive active materials 114 (e.g., intercalation material, manganese oxide, nickel hydroxide, noble metal, perovskite, Prussian blue, silver, spinel, or vanadium), other material additives 116 (e.g., conductive additives, electrolyte retention additives, gas suppressing additives, gelling agents, nucleation additives, plasticizers, stabilization additives, and/or combinations thereof), a binder combination of VAE 118 and methylcellulose-based additive 120, and a tab 122. The conductive substrate 112 is in direct contact with the tab 122. The positive active materials 114 is in direct contact with the conductive substrate 112. The combination of VAE 118 and methylcellulose-based additive 120 bind the conductive substrate 112, positive active materials 114, and other material additives 116 together. Electrolyte can fill void spaces 124 of the positive electrode 110.

Figure 5:
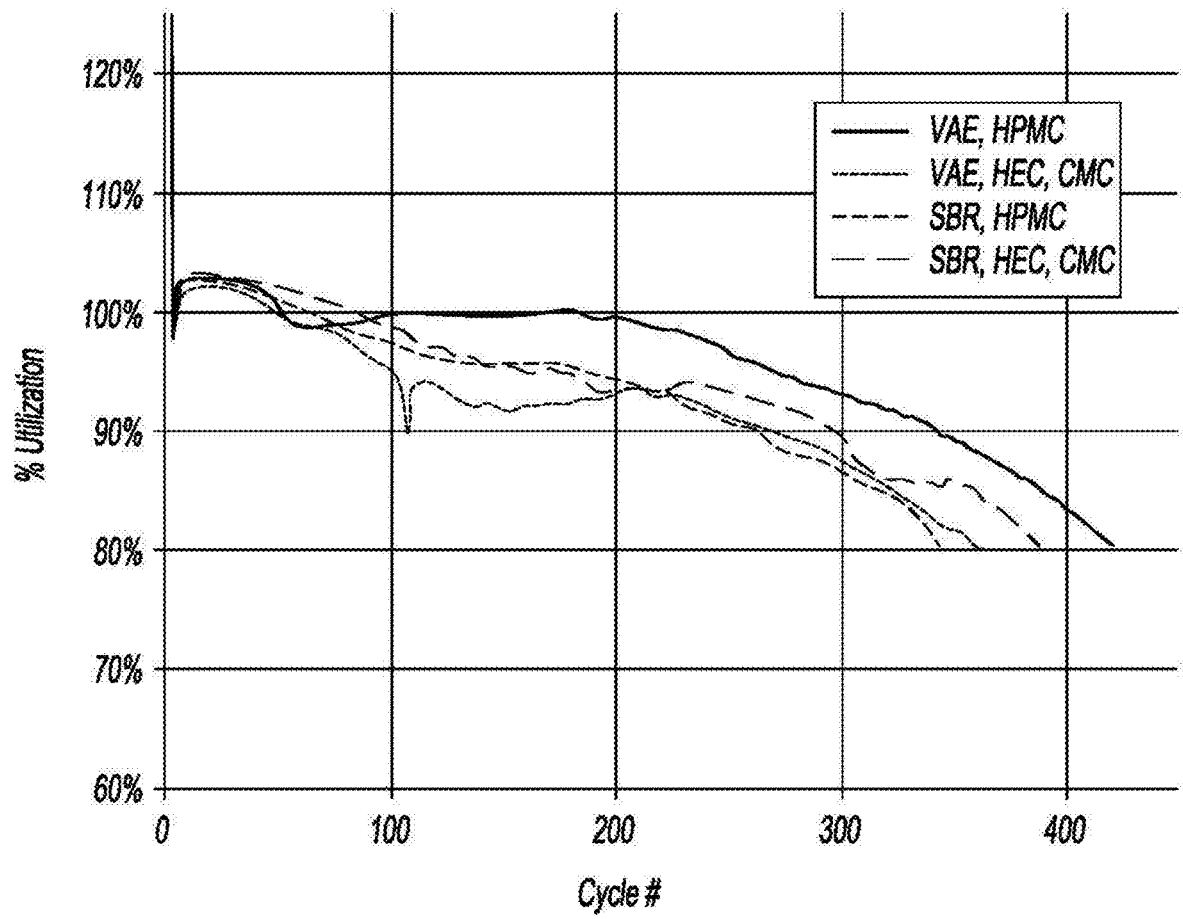
FIG. 5 is a utilization vs. cycle life graph for Ni—Zn cells with negative electrodes containing binder systems including different combinations of VAE and Styrene-Butadiene Rubber (SBR) with HPMC or HydroxyEthyl Cellulose (HEC) and CMC.
Figure 6:
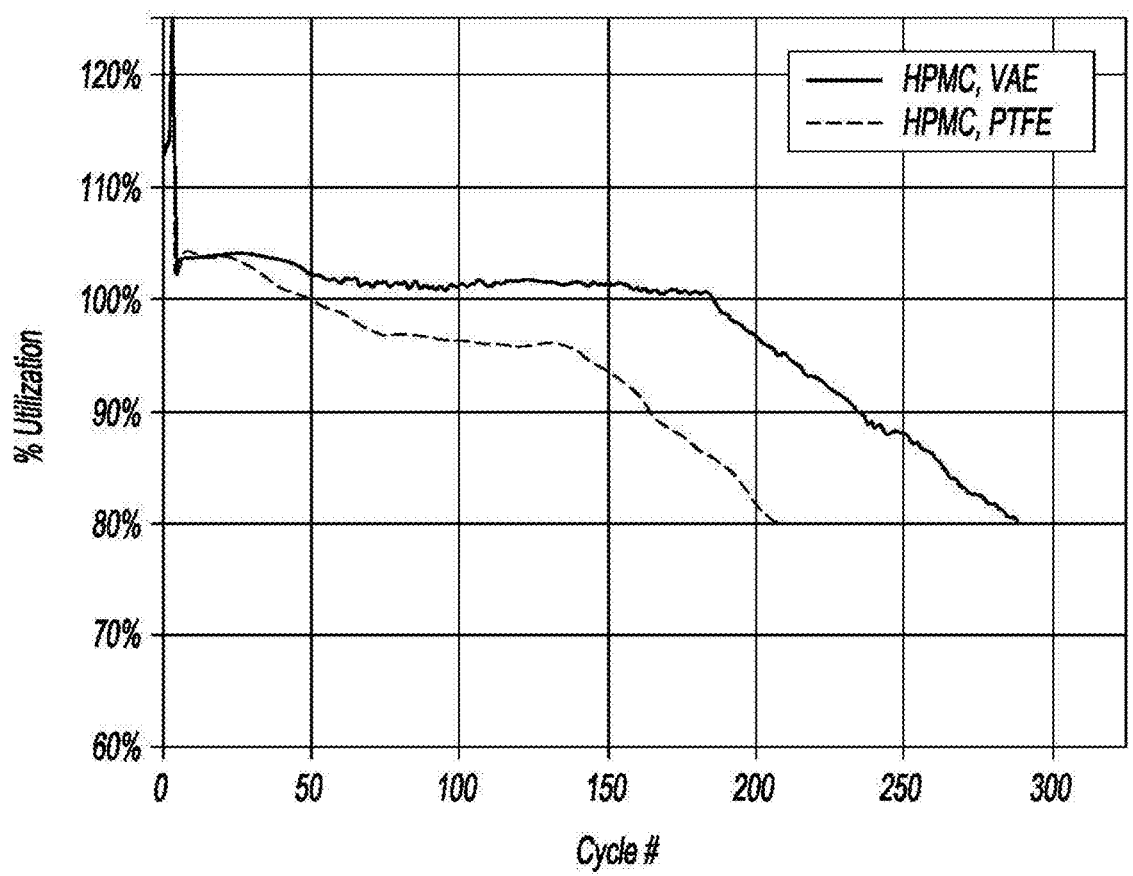
FIG. 6 is a utilization vs. cycle life graph for Ni—Zn cells with positive electrodes containing binder combinations of HPMC with VAE or PolyteTraFluoroEthylene (PTFE).
Figure 7:
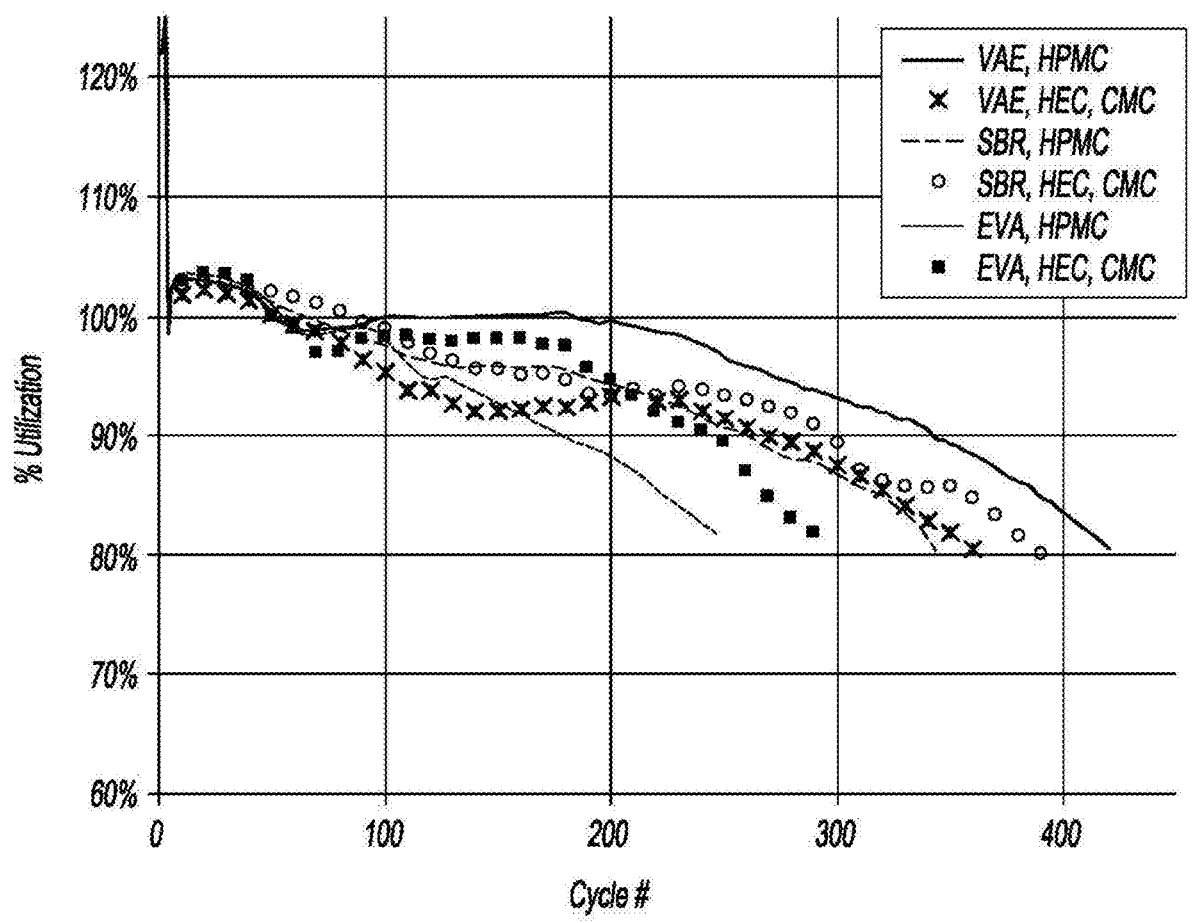
FIG. 7 is a utilization vs. cycle life graph for Ni—Zn cells with negative electrodes containing binder combinations of VAE, SBR, and Ethylene Vinyl Acetate (EVA) with HPMC or HEC and CMC.
Figure 8:
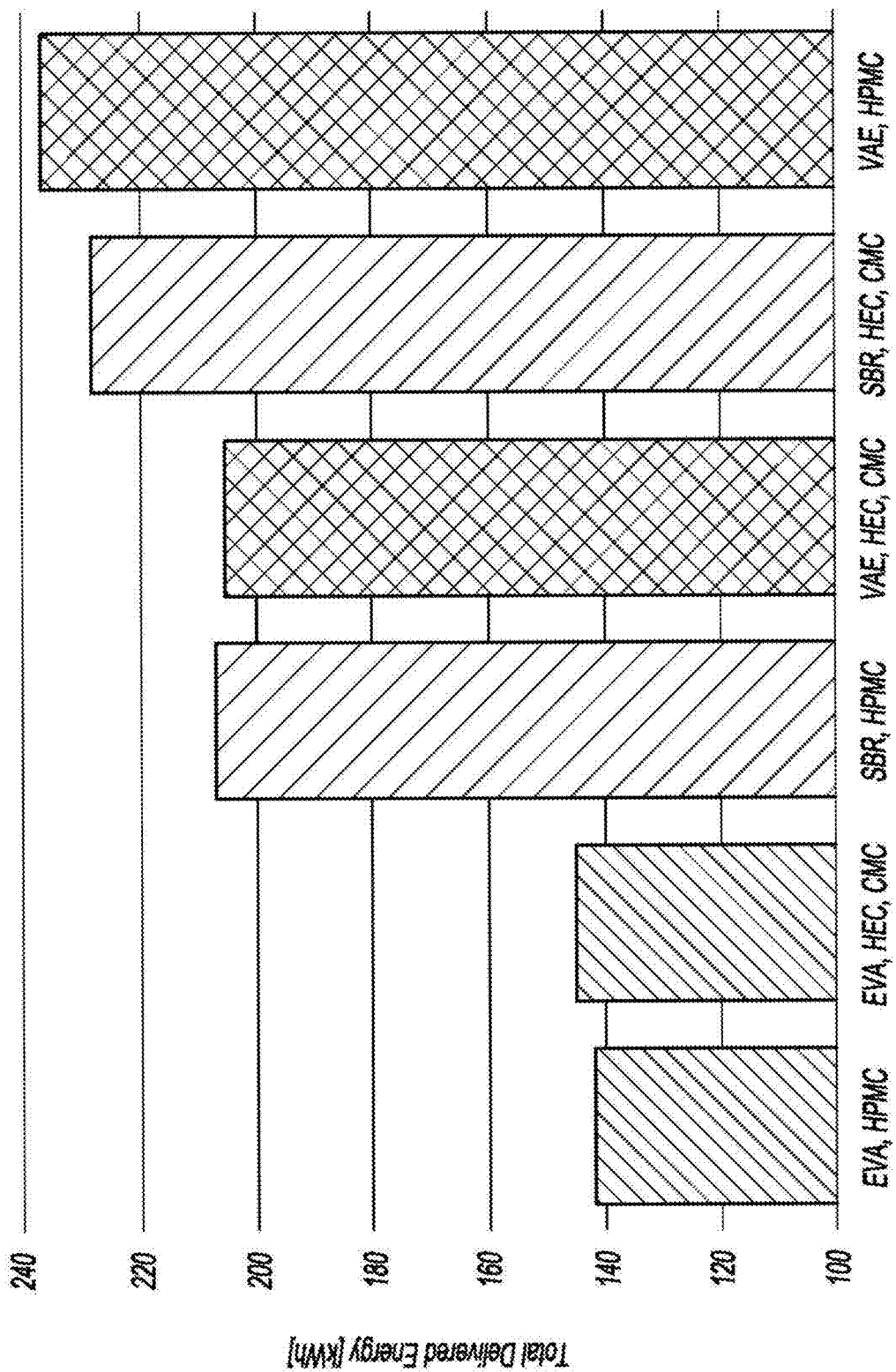
FIG. 8 is a bar graph showing the total measured delivered energy until the cells reached 80% utilization of Ni—Zn Cells with negative electrodes containing binder combinations of EVA, SBR, and VAE with HPMC or HEC and CMC.

As shown in FIGS. 5 and 6, electrodes with VAE and HPMC provide unexpected results of superior utilization vs. cycle life when compared with commonly used binder combinations including SBR, HEC-CMC, and PTFE. These unexpected results are further supported by data comparing the different combinations of binder systems. As shown in FIG. 7, cells with combinations of VAE and HEC-CMC exhibit similar cycle life to cells with SBR and HEC-CMC or HPMC, but outperform cells with EVA and HEC-CMC. However, when combined with HPMC, cells with VAE exhibit longer cycle life than cells with SBR or EVA. The higher performance with the VAE and HMPC binder combination can also be seen in the delivered kilowatt hours compared to the other tested binder combinations, as shown in FIG. 8. These tests demonstrate the unexpected superior performance for electrodes made with VAE and methylcellulose-based binder combinations.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A battery comprising:
   a negative electrode comprising a conductive substrate, active material particles, at least some being in direct contact with the conductive substrate, and a combination of distinct portions of a vinyl acetate-ethylene copolymer binder and distinct portions of a methylcellulose-based polymer binder adhering the conductive substrate and active material particles together to form a three-dimensional structure with void spaces.

2. The battery of claim 1, wherein the vinyl acetate-ethylene copolymer binder is an emulsion of copolymerized vinyl acetate and ethylene with the vinyl acetate equal to or greater than 40 wt % of the copolymerized vinyl acetate and ethylene.

3. The battery of claim 1, wherein the methylcellulose-based polymer binder is carboxymethylcellulose or hydroxypropyl methylcellulose.

4. The battery of claim 1, wherein the active material particles are aluminum-based, cadmium-based, hydrogen absorbing alloys, intercalation material, iron-based, or zinc-based.

5. The battery of claim 1, wherein the conductive substrate is aluminum, brass, bronze, carbon, conductive polymers, copper, stainless steel, steel, tin, titanium, zinc, or combinations thereof.

6. A battery comprising:
   a positive electrode comprising a conductive substrate, active material particles, at least some being in direct contact with the conductive substrate, and a combination of distinct portions of a vinyl acetate-ethylene copolymer binder and distinct portions of a methylcellulose-based polymer binder adhering the conductive substrate and active material particles together to form a three-dimensional structure with void spaces.

7. The battery of claim 6, wherein the vinyl acetate-ethylene copolymer binder is an emulsion of copolymerized vinyl acetate and ethylene with the vinyl acetate equal to or greater than 40 wt % of the copolymerized vinyl acetate and ethylene.

8. The battery of claim 6, wherein the methylcellulose-based polymer binder is carboxymethylcellulose or hydroxypropyl methylcellulose.

9. The battery of claim 6, wherein the active material particles are intercalation material, manganese oxide, nickel hydroxide, noble metal, perovskite, silver, spinel, Prussian blue, or vanadium.

10. The battery of claim 6, wherein the conductive substrate is aluminum, carbon, conductive polymers, nickel, stainless steel, steel, titanium, or combinations thereof.

11. A nickel-zinc battery comprising:

a zinc-based negative secondary electrode comprising a first conductive substrate and first active material particles bound together by a combination of distinct portions of a vinyl acetate-ethylene copolymer binder and distinct portions of a first methylcellulose-based polymer binder to form a first three-dimensional structure with void spaces; and a nickel hydroxide-based positive electrode comprising a second conductive substrate and second active material particles bound together by a combination of distinct portions of a vinyl acetate-ethylene copolymer binder and distinct portions of a second methylcellulose-based polymer binder to form a second three-dimensional structure with void spaces.

12. The nickel-zinc battery of claim 11, wherein the vinyl acetate-ethylene copolymer binder is an emulsion of copolymerized vinyl acetate and ethylene with the vinyl acetate equal to or greater than 40 wt % of the copolymerized vinyl acetate and ethylene.

13. The nickel-zinc battery of claim 11, wherein the first methylcellulose-based polymer binder is carboxymethylcellulose or hydroxypropyl methylcellulose.

14. The nickel-zinc battery of claim 11, wherein the first conductive substrate is aluminum, brass, bronze, carbon, conductive polymers, copper, stainless steel, steel, tin, titanium, zinc, or combinations thereof.

15. The nickel-zinc battery of claim 11, wherein the second conductive substrate is aluminum, carbon, conductive polymers, nickel, stainless steel, steel, titanium, or combinations thereof.

\* \* \* \* \*